(12) United States Patent
Mochizuki et al.

(10) Patent No.: US 7,852,397 B2
(45) Date of Patent: Dec. 14, 2010

(54) ELECTRONIC IMAGING APPARATUS PROVIDED WITH A DUSTPROOF MEMBER

(75) Inventors: Tsuyoshi Mochizuki, Hino (JP); Ryuichi Hirano, Hachioji (JP); Atsushi Yonetani, Tama (JP)

(73) Assignee: Olympus Corporation, Tokyo (JP)

( * ) Notice: Subject to any disclaimer, the term of this patent is extended or adjusted under 35 U.S.C. 154(b) by 730 days.

(21) Appl. No.: 11/591,865

(22) Filed: Nov. 2, 2006

(65) Prior Publication Data

US 2007/0229696 A1 Oct. 4, 2007

(30) Foreign Application Priority Data

Mar. 31, 2006 (JP) ............................. 2006-099400

(51) Int. Cl.
*H04N 5/225* (2006.01)
(52) U.S. Cl. ........................................ 348/340; 348/79
(58) Field of Classification Search ................ 348/340, 348/79, 80; 359/723, 889; 257/680
See application file for complete search history.

(56) References Cited

U.S. PATENT DOCUMENTS

| | | | | |
|---|---|---|---|---|
| 4,533,212 A | * | 8/1985 | Shimizu | 359/892 |
| 4,726,654 A | * | 2/1988 | Kimura et al. | 359/588 |
| 5,046,834 A | * | 9/1991 | Dietrich | 359/381 |
| 5,481,401 A | * | 1/1996 | Kita et al. | 359/353 |
| 5,543,612 A | * | 8/1996 | Kanaya et al. | 250/208.1 |
| 5,550,675 A | * | 8/1996 | Komatsu | 359/514 |
| 5,748,372 A | * | 5/1998 | Kitagawa | 359/565 |
| 6,160,669 A | * | 12/2000 | Nagaoka | 359/686 |
| 6,226,118 B1 | * | 5/2001 | Koyama et al. | 359/380 |
| 6,314,117 B1 | * | 11/2001 | Heim et al. | 372/43.01 |
| 6,323,995 B1 | * | 11/2001 | Takahama et al. | 359/371 |
| 6,400,501 B2 | * | 6/2002 | Tsuchiya et al. | 359/380 |
| 6,560,012 B2 | * | 5/2003 | Adachi et al. | 359/368 |
| 6,859,274 B2 | * | 2/2005 | Inamoto | 356/326 |
| 7,120,025 B2 | * | 10/2006 | Hirano | 361/704 |
| 2004/0080817 A1 | * | 4/2004 | Yamaguchi | 359/385 |
| 2004/0165694 A1 | * | 8/2004 | Yonetani et al. | 378/5 |
| 2005/0073815 A1 | * | 4/2005 | Hirano | 361/704 |
| 2007/0081145 A1 | | 4/2007 | Yonetani et al. | |

FOREIGN PATENT DOCUMENTS

| | | | |
|---|---|---|---|
| JP | 62-264031 A | | 11/1987 |
| JP | 2001-125152 A | | 5/2001 |
| JP | 2001-296583 A | | 10/2001 |
| JP | 2003-110920 A | | 4/2003 |
| JP | 2003172881 A | * | 6/2003 |
| JP | 2003-298855 A | | 10/2003 |
| JP | 2004-312552 A | | 11/2004 |
| JP | 2006-033716 A | | 2/2006 |

* cited by examiner

*Primary Examiner*—Jason Chan
*Assistant Examiner*—Gary C Vieaux
(74) *Attorney, Agent, or Firm*—Holtz, Holtz, Goodman & Chick, PC

(57) ABSTRACT

An image pickup apparatus has an image sensor recording image information; a dustproof glass for keeping hermeticity of the periphery of the image sensor, placed in front of the image sensor; an optical filter removably placed in front of the dustproof glass; and a camera mount placed in front of the optical filter. The image pickup apparatus further has a parfocal adjusting device in which a focal position where the optical filter is demounted can be adjusted so as to be nearly equal to the focal position where the optical filter is mounted.

13 Claims, 7 Drawing Sheets

BAYONET ENGAGEMENT GROOVE    FLANGE PORTION

BAYONET CLAW

ENGAGEMENT PORTION     3b

INSERTION SPACE
BAYONET LUG            5c

PIN

ELECTRONIC IMAGING APPARATUS PROVIDED WITH A DUSTPROOF MEMBER

This application claims benefits of Japanese Application No. 2006-99400 filed in Japan on Mar. 31, 2006, the contents of which are hereby incorporated by reference.

BACKGROUND OF THE INVENTION

1. Field of the Invention

This invention relates to an image pickup apparatus, such as an electronic imaging apparatus, mounted to and used in a microscope in order to photograph a specimen, for instance, and in particular, to an image pickup apparatus in which different optical filters can be selected and used in accordance with applications.

2. Description of Related Art

Conventional image pickup apparatuses of this type are set forth, for example, in Japanese Patent Kokai Nos. 2001-125152, 2001-296583, 2003-298855, and 2004-312552. Each of these image pickup apparatuses is designed so that an optical filter to be used can be arbitrarily selected according to the purpose of image pickup.

In recent years, as image pickup apparatuses for microscopes, imaging apparatuses using electronic image sensors such as CCDs have been popularized, and in the electronic image sensors, tendencies to a low cost and a high sensitivity as well are growing. In microscope observations, specimens with wide transmittances and reflectances ranging from high to low are handled. Consequently, there is the problem that in the imaging apparatus using an electronic image sensor with a high sensitivity, feeble flare is also imaged with a good sensitivity, and particularly, when a living specimen of high transmittance and a metallic specimen of high reflectance are photographed, flare is liable to become prominent.

When the case where a plane-parallel optical member (such as a low-pass filter or an IR cutoff filter) generally incorporated in the image pickup apparatus is mounted in an imaging optical path is compared with the case where it is demounted therefrom, an optical path length corresponding to its thickness is changed and as a result, the image-forming position of an observation image is delicately shifted. In particular, in the microscope observation that is small in focal depth as in a total reflection fluorescence observation of a living body, the shift of the image-forming position (the focal position) of the observation image produces a considerable adverse effect on the focusing condition of an image obtained through the image sensor.

SUMMARY OF THE INVENTION

The image pickup apparatus according to the present invention comprises an image sensor recording image information; a dustproof glass for keeping hermeticity of the periphery of the image sensor, placed in front of the image sensor; an optical filter removably placed in front of the dustproof glass; and a camera mount placed in front of the optical filter.

The image pickup apparatus of the present invention preferably has parfocal adjusting means in which a focal position where the optical filter is demounted can be adjusted so as to be nearly equal to the focal position where the optical filter is mounted.

According to the present invention, the parfocal adjusting means should preferably be a plate-shaped glass provided with a thickness and a refractive index such that an optical path length from the mount to the image sensor where the means is mounted instead of the optical filter is nearly equal to the optical path length where the optical filter is mounted.

According to the present invention, the parfocal adjusting means should preferably be a spacer member that is capable of adjusting a distance between the camera mount and the image sensor.

The image pickup apparatus of the present invention preferably has a screw-, bayonet-, or magnet-type mounting and demounting mechanism so that the optical filter can be mounted and demounted through the mounting and demounting mechanism.

In the image pickup apparatus of the present invention, it is desirable that either the dustproof glass or the optical filter, or both, are placed in an inclined state.

In the image pickup apparatus of the present invention, it is desirable that the optical filter has a predetermined coating applied to, at least, the opposite-side surface of the optical filter with respect to the image sensor.

The image pickup apparatus of the present invention has a lens provided with the function of the optical filter, removably placed, instead of the optical filter.

In the image pickup apparatus of the present invention, it is desirable that a plurality of optical filters or lenses provided with the functions of the optical filters are removably arranged.

In the image pickup apparatus of the present invention, it is desirable that the dustproof glass has an antireflection coating, applied to at least one surface, reducing a reflectance in an infrared wavelength region or an ultraviolet wavelength region, or the infrared wavelength region and the ultraviolet wavelength region, in addition to the reflectance in a visible region.

In the image pickup apparatus of the present invention, it is desirable that at least one of the dustproof glass and the plurality of optical filters is placed in an inclined state.

According to the present invention, it is possible to obtain the image pickup apparatus in which the optical property can be arbitrarily selected by mounting and demounting or replacing the optical filter according to the purpose of use, the production of flare is suppressed according to the observation of a specimen of different transmittance or reflectance, with a low-cost and simple structure, and even when the optical filter is mounted or demounted, the observation image can be obtained in a favorable focusing condition. As a result, even when a specimen with high reflectance is photographed, the production of flare can be suppressed and it becomes possible to accommodate the photographing of the specimen of luminance in a wider range. Moreover, a low-cost electronic imaging apparatus that is capable of eliminating flare at a low cost can be realized.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
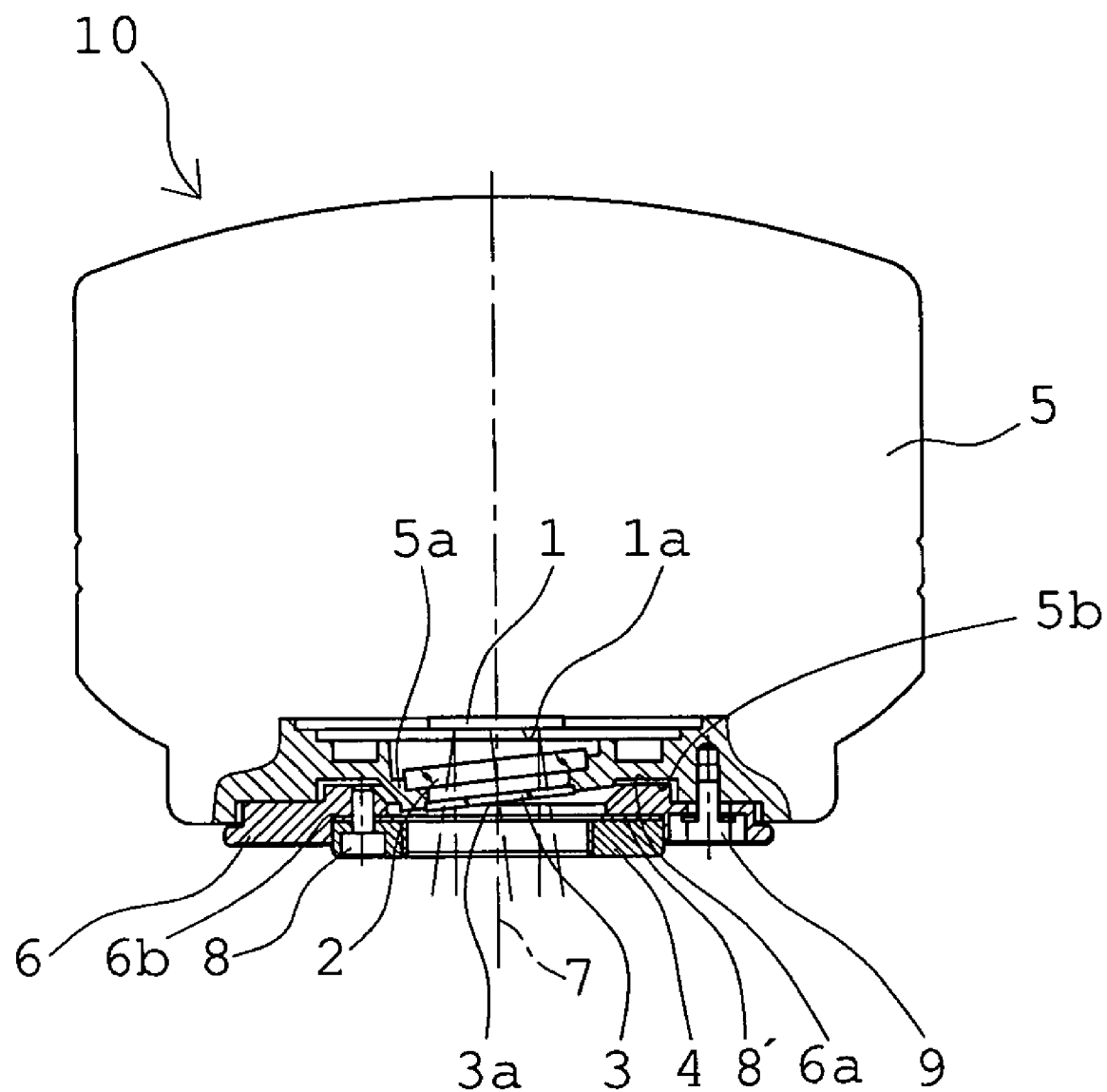
FIG. 1 is a sectional view of essential parts showing the structure of an electronic imaging apparatus for microscopes as the image pickup apparatus of Embodiment 1 in the present invention.

Before undertaking the description of the embodiments, the function of the present invention will be explained. Generally, in front of a light-receiving portion of the image sensor (namely in the direction of incidence of light thereon), a nearly plane-parallel optical member combining functions for the protection and dust prevention of the light-receiving portion is often provided. On the other hand, however, this nearly plane-parallel optical member is in most cases responsible for flare produced when the image pickup apparatus is connected to a microscope to pick up an image. This is because the nearly plane-parallel optical member has a relatively high surface reflectance. Of light incident on the light-receiving portion, for example, part of the light is reflected by the nearly plane-parallel optical member. This reflected light is reflected again toward the image sensor by lenses and other optical elements of a microscope optical system. This operation is repeated several times and the so-called multiple reflection is caused. As a result, a great deal of spot-shaped flare (which is hereinafter called the spot flare) is produced. In this case, when the surface reflectance of the plane-parallel glass is high, the amount of light (light intensity) of the spot flare is increased. The spot flare is thus picked up together with the image. In the conventional image pickup apparatus set forth in each of the prior art references mentioned above, the idea that the flare is eliminated by considering the configuration of the dustproof glass itself is not adopted.

In the image pickup apparatus of the present invention, however, the dustproof glass (corresponding to the plane-parallel glass) for keeping hermeticity of the periphery of the image sensor is placed in front of the image sensor (for example, is fixedly placed in a state where it is inclined along the direction of the minor side of the image sensor). Whereby, the flare attributable to the surface reflection of the dustproof glass can be lessened. Also, it is desirable that an angle of inclination of the dustproof glass to the optical axis is made so that light reflected by the surface of the dustproof glass arrives outside an effective imaging area of the image sensor. However, if the angle of inclination is too large, the problem will be caused that a space required to provide the dustproof glass becomes wide and thus compactness of the image pickup apparatus cannot be achieved or requirements of the mount cannot be satisfied.

In the image pickup apparatus of the present invention, the optical filter is removably provided, independent of the dustproof glass. For space saving and a reduction of the number of parts, it is desired to provide an optical member combining the dustproof glass with the optical filter by applying a coating with a preset spectral characteristic to the surface of the dustproof glass. However, when such an optical member is fixed as the dustproof glass to the body of the image pickup apparatus, the function of the optical filter ceases to be selectable according to the application of image pickup. On the other hand, when the optical member is rendered removable, the function of the dustproof glass is lost when it is removed, and the image sensor is exposed to the outside atmosphere so that dust particles are liable to penetrate into the apparatus. Moreover, the optical member cannot be applied to a cooling-sealed image sensor like a so-called cooled CCD, and the application of the image pickup apparatus is limited.

However, as in the present invention, when the optical filter is removably placed, independent of the dustproof glass, the optical property can be arbitrarily selected according to the purpose of use and at the same time, adherence of dust particles to the image sensor can be blocked. In addition, by the maintenance of cooling performance and the prevention of adherence of water drops, the optical filter can also be applied to the cooling-sealed image sensor and the application of the image pickup apparatus can be widened.

The image pickup apparatus of the present invention preferably has the parfocal adjusting means in which a focal position where the optical filter is demounted can be adjusted so as to be nearly equal to the focal position where the optical filter is mounted. By doing so, even when the optical filter is mounted in the imaging optical path or even when it is demounted therefrom, the image-forming position can be located on the imaging surface of the image sensor and the observation image can be obtained in a favorable focusing condition.

The parfocal adjusting means can be constructed with a plate-shaped glass that has a thickness and a refractive index such that an optical path length from the mount to the image sensor where the means is mounted instead of the optical filter is nearly equal to the optical path length where the optical filter is mounted. Alternatively, the parfocal adjusting means may be constructed with a spacer member, such as a washer, that is capable of adjusting a distance between the camera mount and the image sensor.

The image pickup apparatus of the present invention preferably has a screw-, bayonet-, or magnet-type mounting and demounting mechanism so that the optical filter can be mounted and demounted through the mounting and demounting mechanism. When the bayonet-type mounting and demounting mechanism is used, damage caused in mounting and demounting the optical filter can be prevented. When the magnet-type mounting and demounting mechanism is used, damage caused in mounting and demounting the optical filter can be prevented and a mounting and demounting operation can be very simplified. In the image pickup apparatus of the present invention, the optical filter is preferably displaced, for example, in a state where it is inclined along the direction of the minor side of the image sensor. In the optical filter as well, the surface reflection at the plane of incidence occurs as in the plane-parallel glass constituting the dust-proof glass mentioned above.

However, like the present invention, when the optical filter is placed in an inclined state, flare caused by the surface reflection of the optical filter can also be lessened. In this case, it is desirable that the angle of inclination of the optical filter to the optical axis is made so that light reflected by the surface of the optical filter arrives outside the effective imaging area of the image sensor. However, if the angle of inclination is too large, the problem will be caused that a space required to provide the optical filter becomes wide and thus compactness of the image pickup apparatus cannot be achieved or requirements for the mount cannot be satisfied. Thus, it is good practice to make the angle of inclination of the optical filter coincide with the angle of inclination of the dustproof glass to the optical axis.

In the image pickup apparatus of the present invention, the optical filter preferably has a predetermined coating applied to, at least, the opposite-side surface of the optical filter with respect to the image sensor. In a reflection-type optical filter, reflection is produced by a coated surface. When a reflecting surface is located as far away from the image sensor as possible, it becomes easy to escape light responsible for flare outside the effective imaging area of the image sensor.

The image pickup apparatus of the present invention can also be designed to have a lens provided with the function of the optical filter, removably placed, instead of the optical filter. Whereby, it becomes possible to use a relatively thin lens in the image pickup apparatus of the structure such that formerly has required a thick optical filter for the plane-parallel shape. It is also possible to correct residual aberration contained in a light beam incident on the image pickup apparatus and to provide the function of moderating a shading phenomenon by correcting the angle of a light ray so as to accommodate the characteristic of the angle of incidence of the light ray on the image sensor to be used. In addition, when a lens is removably placed instead of the optical filter, the lens is mounted and demounted and thereby two functions, the mounting and demounting of the optical filter and the parfocal adjustment, can be performed at the same time.

Embodiment 1

FIG. 1 shows essential parts of the structure of an electronic imaging apparatus for microscopes as the image pickup apparatus of Embodiment 1 in the present invention. An electronic imaging apparatus 10 of Embodiment 1 has a CCD 1 as the image sensor recording image information, a dustproof glass 2, an optical filter 3, and a C-mount 4 as a camera mount. The CCD 1 is provided inside a body section 5. The dustproof glass 2 is constructed with a plane-parallel glass, is located in front of the CCD 1 (on the lower side in the plane of the page), and is fixedly placed in an inclined state on a glass mounting portion 5a of the body section 5 to keep hermeticity of the periphery of the CCD 1. The optical filter is removably placed as described later in front of the dustproof glass 2. The C-mount 4 is located before the optical filter 3.

To the body section 5, a mount section 6 for mounting the C-mount 4 is connected. The mount section 6 is such that one surface 6a comes in contact with a surface 5b of the body section 5 opposite thereto, and is mounted to the body section 5 through screws 9. The C-mount 4 is constructed so that it can be connected to the optical apparatus such as a microscope, and is mounted, through screws 8, to an opposite-side surface 6b of the mount section 6 with respect to the body section 5, The optical filter 3 is an optical element, such as an IR cutoff filter or an ND filter, in which, of light incident from the optical apparatus, such as the microscope, connecting the image pickup apparatus, light in a preset wavelength region is transmitted or blocked in accordance with a preset transmittance and is constructed so that a preset coating is applied to the plane-parallel glass. Also, in FIG. 1, reference numeral 7 denotes an optical axis.

When a direction perpendicular to the optical axis 7 is thought of as a reference axis, the dustproof glass 2 and the optical filter 3 are arranged to incline at a preset angle with respect to the reference axis so that light reflected by the surfaces of the dustproof glass 2 and the optical filter 3 arrives outside the effective imaging area of the CCD 1 that is the image sensor. The coated surface of the optical filter 3 is, of course, inclined at the same angle with respect to the reference axis. Such inclination is along the direction of the minor side of a light-receiving surface 1a of the CCD 1.

Figure 2:
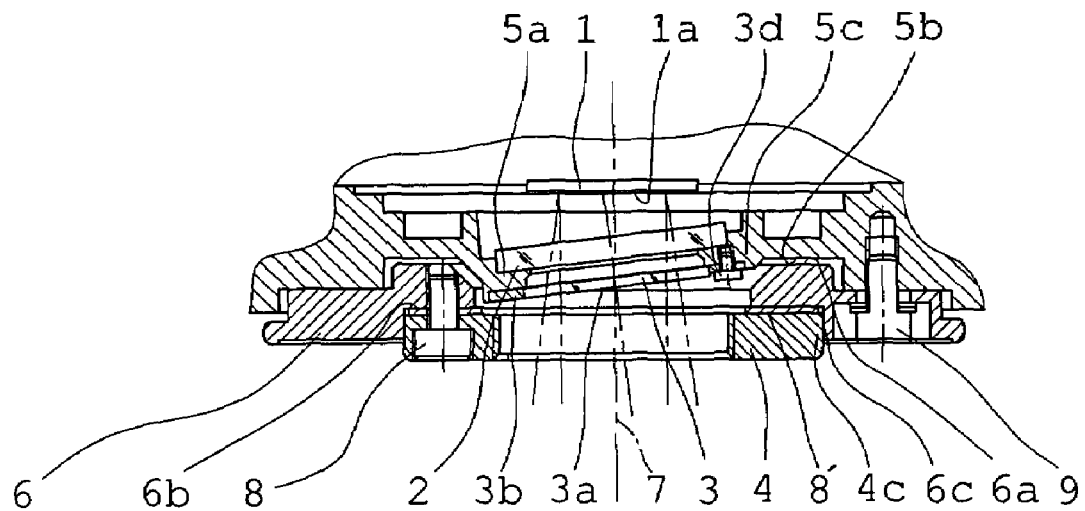
FIG. 2 is a sectional view of essential parts of the electronic imaging apparatus showing one example of the mounting and demounting mechanism of the optical filter used in the electronic imaging apparatus of Embodiment 1.

In Embodiment 1, the optical filter 3 is placed so that a coated surface 3a of the optical filter 3 is, at least, the opposite-side (the optical-apparatus-side) surface of the optical filter 3 with respect to the light-receiving surface 1a of the CCD 1 and so that even when the optical filter 3 is of the reflection type, the coated surface with high reflectance can be located as far away from the light-receiving surface 1a as possible. The optical filter 3, for example, as shown in FIG. 2, is fixed to a filter frame 3b. The filter frame 3b is constructed so that it can be mounted to, and demounted from, a filter mounting portion 5c of the body section 5 through screws 3d. In Embodiment 1, as mentioned above, the C-mount 4 is mounted to the mount section 6 through the screws 8. As such, after the screws 8 fastening the C-mount 4 are removed and the C-mount 4 is removed from the mount section 6, the screws 3d fastening the filter frame 3b are demounted and thereby the optical filter 3 can be demounted. In addition, the optical filter 3 can be replaced with an optical filter 3' that has a different spectral transmittance characteristic. Also, an outer circumferential portion 4c of the C-mount 4 is fitted into an inner circumferential portion 6c of the mount section 6 so that even when the C-mount 4 is mounted or demounted, an image formed on the CCD 1 is not decentered.

Figure 3:
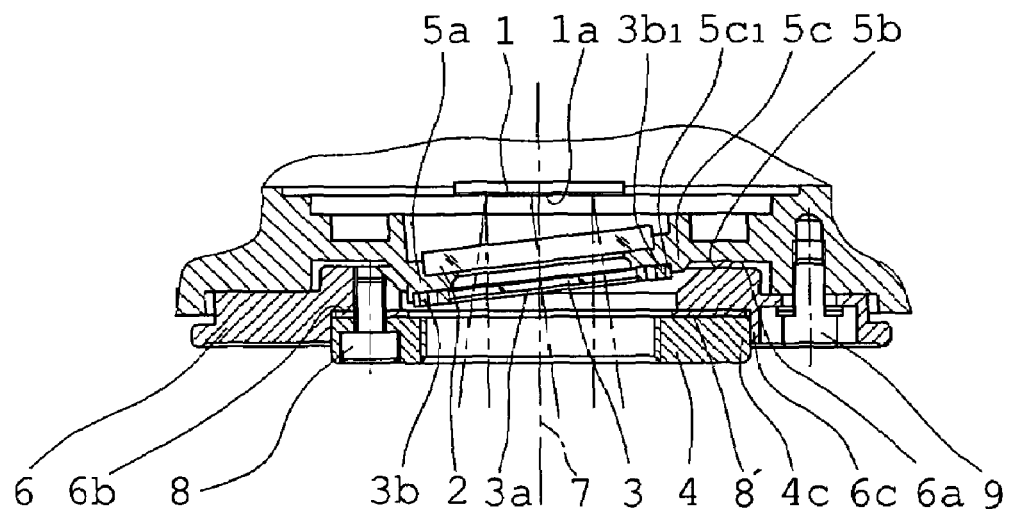
FIG. 3 is a sectional view of essential parts of the electronic imaging apparatus showing another example of the mounting and demounting mechanism of the optical filter used in the electronic imaging apparatus of Embodiment 1.

As shown in FIG. 3, the present invention may be constructed so that thread grooves $3b_1$ and $5c_1$ are provided on the outer circumference of the filter frame 3b and the inner circumference of the filter mounting portion 5c, respectively, and the filter frame 3b can be screwed to the filter mounting portion 5c. The filter frame 3b is provided with a pair of holes that are close to each other and a pair of projections configured close to each other on a tool are put in the pair of holes to turn the filter frame 3b. Whereby, the filter frame 3b can be mounted and demounted.

Figure 4A:
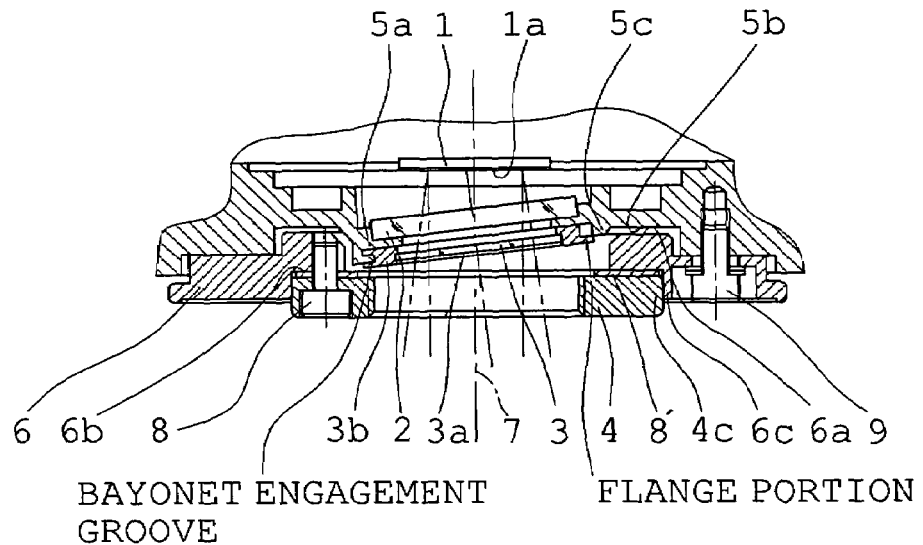
FIGS. 4A, 4B, and 4C are explanatory views showing still another example of the mounting and demounting mechanism of the optical filter used in the electronic imaging apparatus of Embodiment 1, which are a sectional view of essential parts of the electronic imaging apparatus, a plan view showing the structure of a filter frame, and a plan view showing the structure of a filter mounting portion, respectively.
Figure 4B:
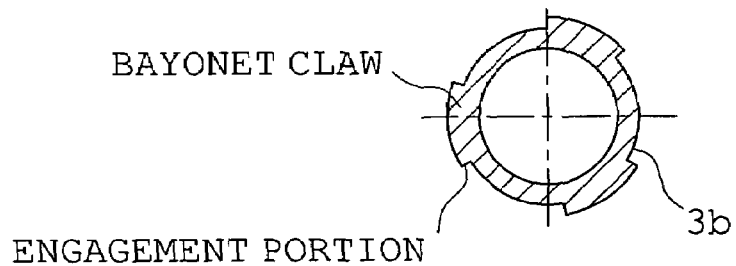
Figure 4C:
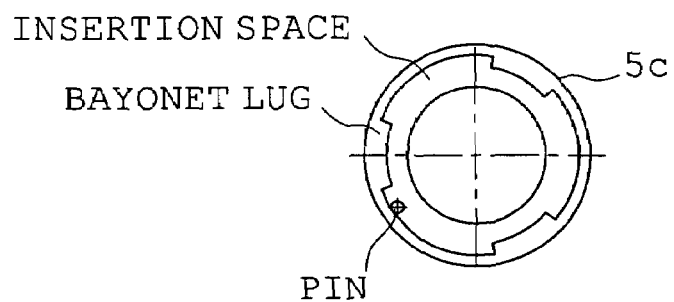

Alternatively, as shown in FIGS. 4A-4C, the filter frame 3b and the filter mounting portion 5c may be constructed as the bayonet-type mounting and demounting mechanism. The filter frame 3b is constructed with bayonet claws (provided at three places) and a flange portion. On the other hand, the filter mounting portion 5c is constructed with bayonet lugs (provided at three places) and a pin. The bayonet claws of the filter frame 3b are put in an insertion space of the filter mounting portion 5c and are rotated until an engagement portion is engaged with the pin, and thereby the filter frame 3b can be mounted to the filter mounting portion 5c. In addition, from this state, the filter frame 3b is rotated so that the bayonet claw separates from the pin and is situated in the insertion space of the filter mounting portion 5c, and thereby the filter frame 3b can be demounted from the filter mounting portion 5c.

Figure 5A:
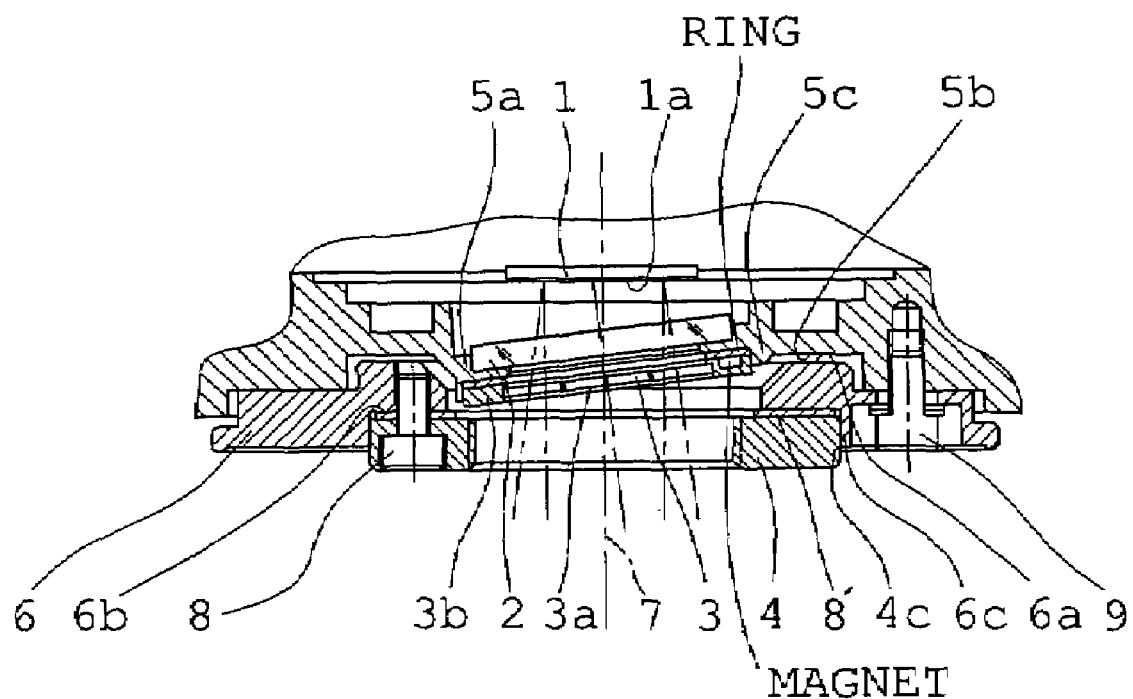
FIGS. 5A and 5B are explanatory views showing a further example of the mounting and demounting mechanism of the optical filter used in the electronic imaging apparatus of Embodiment 1, which are a sectional view of essential parts of the electronic imaging apparatus and a plan view showing the structure of a filter frame, respectively.
Figure 5B:
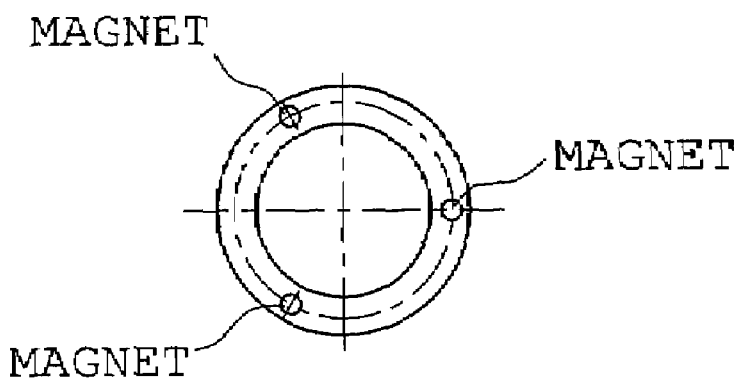

Instead, as illustrated in FIGS. 5A and 5B, the filter frame 3b and the filter mounting portion 5c may be constructed as the magnet-type mounting and demounting mechanism. The filter mounting portion 5c is provided with a ring-shaped iron plate. On the other hand, the filter frame 3b is provided with (three) magnets at positions where they come in contact with the ring-shaped iron plate. The magnets provided to the filter frame 3b attract the ring-shaped iron plate provided to the filter mounting portion 5c, and thereby the filter frame 3b can be mounted to the filter mounting portion 5c. In addition, from this state, the filter frame 3b is repelled toward the opposite side of the ring-shaped iron plate of the filter mounting portion 5b, and thereby the filter frame 3b can be demounted from the filter mounting portion 5c.

Also, although in FIGS. 5A and 5B the ring-shaped iron plate is provided to the filter mounting portion 5c and the magnets are provided to the filter frame 3b, the magnet-type mounting and demounting mechanism may be constructed in such a way that the filter frame 3b is made with an iron member and the magnets are provided at positions where they come in contact with the filter frame 3b in the filter mounting portion 5c.

Figure 6A:
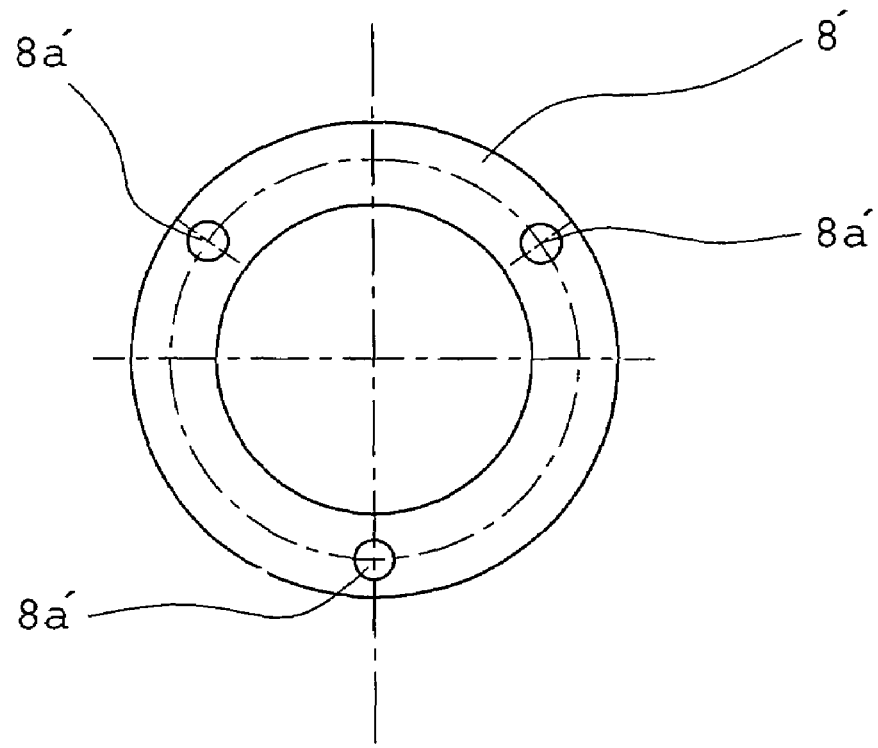
FIGS. 6A and 6B are plan and side views showing an example of a parfocal adjusting means used in the electronic imaging apparatus of Embodiment 1.
Figure 6B:
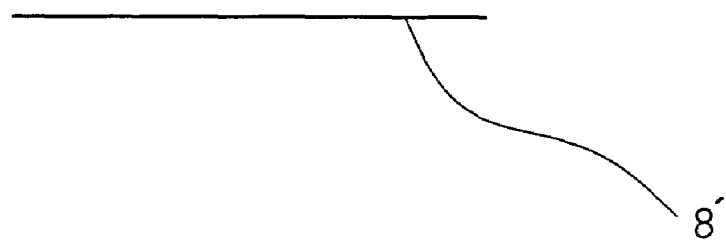

In the electronic imaging apparatus 10 of Embodiment 1, a washer 8' provided as the parfocal adjusting means is removably interposed between the C-mount 4 and the mount section 6 so that the focal position where the optical filter 3 is not mounted is nearly equal to that where the optical filter 3 is mounted. The washer 8' is configured, for example, as shown in FIGS. 6A and 6B, and functions as a spacer member that is capable of adjusting a distance between the camera mount and the image sensor. Also, in FIG. 6A, reference numeral 8a' denotes thread holes for receiving the screws 8.

Figure 7:
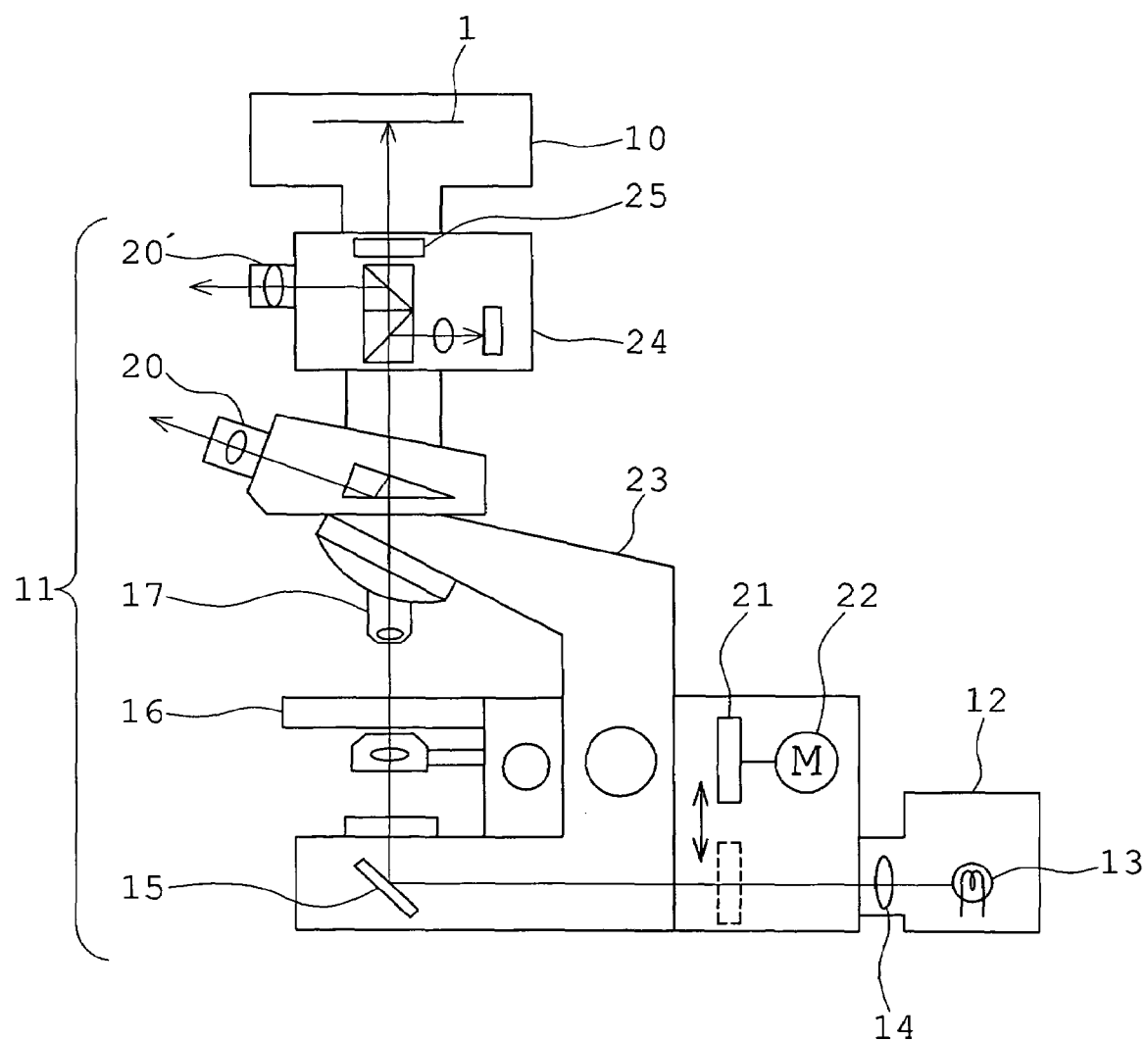
FIG. 7 is a schematic view showing an example of a case where the electronic imaging apparatus of Embodiment 1 is attached to a microscope.

The electronic imaging apparatus 10 as the image pickup apparatus of Embodiment 1 constructed as mentioned above is used in such a manner that it is connected to a microscope, such as that shown in FIG. 7, through the C-mount 4 jointed to the mount section 6 when a specimen is photographed. In a microscope 11 shown in FIG. 7, light from a light source 13 in a light source device 12 is rendered nearly parallel by a collector lens 14 and is reflected by a mirror 15 to irradiate the specimen (not shown in the figure). Light from the specimen is incident on the electronic imaging apparatus 10 of Embodiment 1 through an objective lens 17 so that the image of the specimen is formed on the CCD 1. Also, in FIG. 7, reference numeral 16 denotes a stage, 20 and 20' denote eyepieces, 21 denotes a filter, 22 denotes a driving means for moving the filter in and out of the optical path, and 23 denotes a microscope support. Reference numeral 24 represents a prism box for confirming focusing and framing and for calculating the amount of exposure and 25 represents a shutter for exposure.

According to Embodiment 1, of incident light from the specimen traveling through the microscope, light of a preset wavelength is cut off by the optical filter 3. Light passing through the optical filter 3 arrives on the light-receiving surface 1a of the CCD 1 through the dustproof glass 2 to form the image of the specimen. In this case, part of light reaching the dustproof glass 2 and the optical filter 3, arranged in front of the light-receiving surface 1a is reflected back toward a microscope optical system. This reflected light repeats reflection between these members 2 and 3 and the microscope optical system. In this case, in the electronic imaging apparatus of Embodiment 1, the dustproof glass 2 and the optical filter 3 are arranged to incline at a preset angle with respect to the light-receiving surface 1a of the CCD 1 so that light reflected by the surface of the dustproof glass 2 and the coated surface 3a of the optical filter 3 arrives outside the effective imaging area of the CCD 1. Consequently, the frequency that the light reflected by the surface of the dustproof glass 2 and the coated surface 3a of the optical filter 3 reaches the light-receiving surface is materially decreased and the production of flare can be suppressed.

The optical filter 3 is placed so that a predetermined coating is applied to, at least, the opposite-side surface of the optical filter with respect to the CCD 1, and thus even when reflection is caused by the coated surface in the reflection-type optical filter, the reflecting surface can be located as far away from the CCD 1 as possible and it becomes easy to escape light responsible for flare outside the effective imaging area of the CCD 1.

In the electronic imaging apparatus 10 of this embodiment, since the dustproof glass 2 and the optical filter 3 are further inclined along the direction of the minor side of the effective imaging area of the CCD 1, they require small angles of inclination, and the setting space of the dustproof glass 2 and the optical filter 3 can be minimized. In the electronic imaging apparatus 10 connected to the microscope shown in FIG. 7, the optical filter 3 is mounted to, and dismounted from, the body section 5 or is replaced with an optical filter with another optical property in accordance with the application of the observation. At this time, in the electronic imaging apparatus 10 of Embodiment 1, since the optical filter 3 is removably placed, independent of the dustproof glass 2, the optical property can be arbitrarily selected according to the purpose of use and at the same time, adherence of dust particles to the CCD 1 can be blocked. In addition, by the maintenance of cooling performance and the prevention of adherence of water drops, the optical filter can be applied to the cooling-sealed CCD 1 and the application of the image pickup apparatus can be widened.

In the electronic imaging apparatus 10 of Embodiment 1, the focal position where the optical filter 3 is demounted through the washer 8' can be adjusted so as to be nearly equal to that where the optical filter is mounted. Therefore, even when the optical filter 3 is mounted in the imaging optical path or even when it is demounted therefrom, the image-forming position can be located on the imaging surface of the CCD 1 and the observation image can be obtained in a favorable focusing condition. Also, a plate-shaped glass with a thickness may be mounted such that an optical path length from the mount to the CCD 1 where a substitute for the optical filter 3 is mounted is nearly equal to the optical path length where the optical filter 3 is mounted. In this case also, almost the same effect as in the case where the washer 8' is used can be obtained.

Also, in Embodiment 1, the dustproof glass 2 is used as one to which an antireflection coating is not applied. However, it is desirable to apply the antireflection coating. By doing so, the production of flare can be more suppressed. Further, for example, in the case where the optical filter 3 is an IR cutoff filter, when the filter is demounted, photographing in the infrared wavelength region also becomes possible. In this case, however, it is desirable that the antireflection coating, in which the reflectance is lowered not only in the visible region, but also in the infrared wavelength region, is applied to the dustproof glass 2 so that it is hard to produce flare in the infrared wavelength region. Still further, when the antireflection coating in which the reflectance is also lowered in the ultraviolet wavelength region is applied, photographing in which the production of flare is suppressed in the ultraviolet wavelength region as well becomes possible.

Embodiment 2

Figure 8:
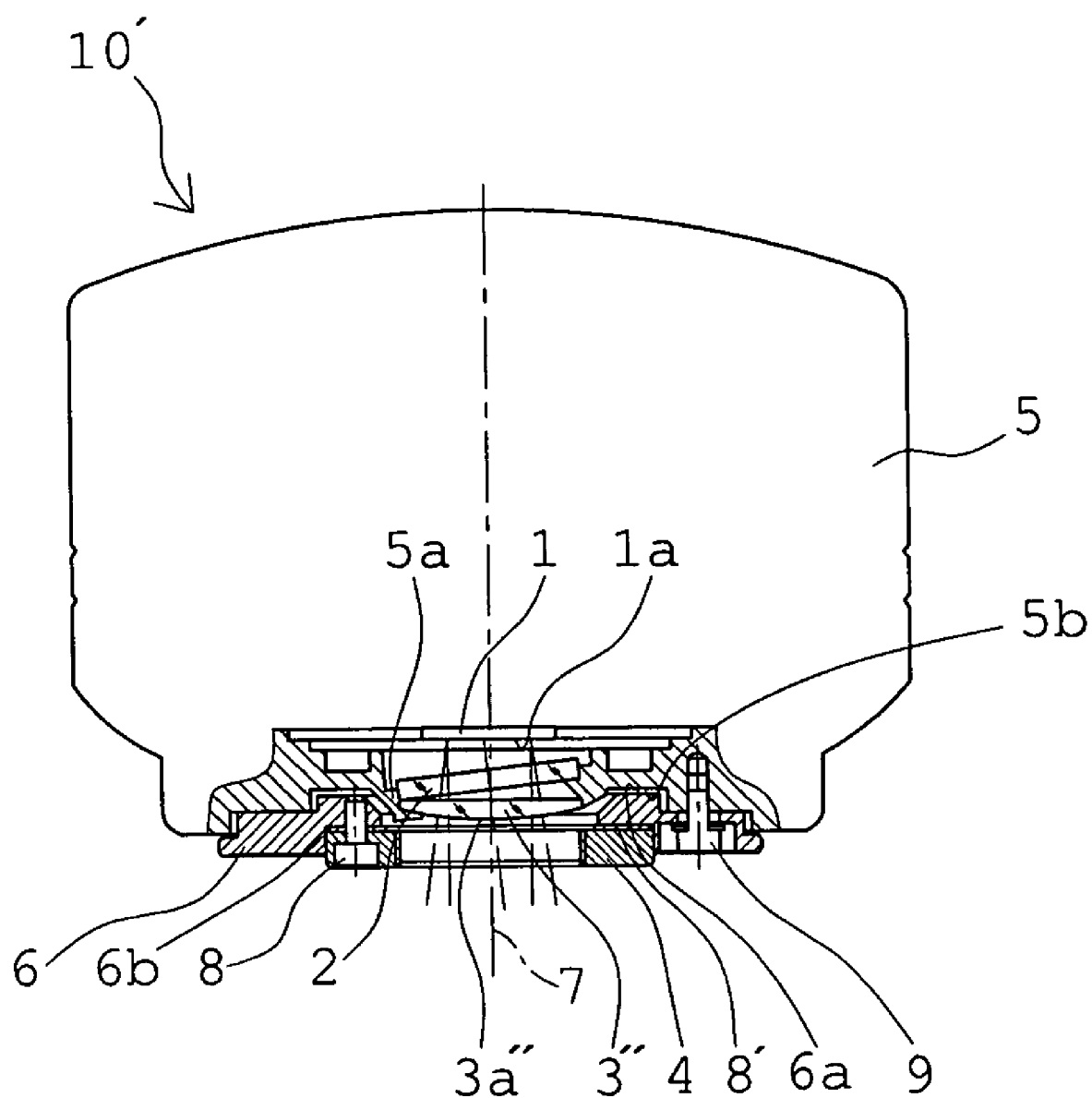
FIG. 8 is a sectional view of essential parts showing the structure of the electronic imaging apparatus for microscopes as the image pickup apparatus of Embodiment 2 in the present invention.

FIG. 8 shows essential parts of the electronic imaging apparatus for microscopes as the image pickup apparatus of Embodiment 2 in the present invention. An electronic imaging apparatus 10' of Embodiment 2 is constructed so that a lens 3" provided with the function of the optical filter is removably placed instead of the optical filter 3 in the electronic imaging apparatus 10 of Embodiment 1.

According to the electronic imaging apparatus 10' of Embodiment 2 constructed as mentioned above, the image pickup apparatus of the structure that formerly has required a thick optical filter for a nearly plane-parallel plate can be constructed with a lens of relatively small thickness. It is also possible to correct residual aberration contained in a light beam incident on the image pickup apparatus and to provide the function of moderating a shading phenomenon by correcting the angle of a light ray so as to accommodate the characteristic of the angle of incidence of the light ray on the image sensor to be used. In addition, the lens 3" is mounted and demounted and thereby two functions, the mounting and demounting of the optical filter and the parfocal adjustment, can be performed at the same time. Other structures, functions, and effects are almost the same as in the image pickup apparatus of Embodiment 1.

For the convenience of the explanation, reference has been made to arrangements that the optical filter (the optical filter 3) in Embodiment 1 and the lens (the lens 3") provided with the function of the optical filter in Embodiment 2 are each removably placed as a single member. However, the image pickup apparatus of the present invention is not limited to such arrangements, and the structure that a plurality of optical filters or lenses provided with the functions of the optical filters are removably arranged is also applicable.

The electronic imaging apparatus of the present invention is useful for the field that it is needed to obtain the observation image of the specimen of widely different transmittance or reflectance in the microscope observation.

What is claimed is:

1. An electronic imaging apparatus comprising:
an image sensor which records image information;
a dustproof glass which is placed in front of the image sensor, and which keeps a hermeticity of a periphery of the image sensor;
an optical filter which is removably placed in front of the dustproof glass; and
a camera mount which is placed in front of the optical filter, wherein the dustproof glass and the optical filter are placed in an inclined state with respect to a light receiving surface of the image sensor, and an inclination angle of the optical filter coincides with an inclination angle of the dustproof glass.

2. The electronic imaging apparatus according to claim 1, further comprising parfocal adjusting means for adjusting a focal position in a condition in which the optical filter is demounted to substantially coincide with the focal position in a condition in which the optical filter is mounted.

3. The electronic imaging apparatus according to claim 2, wherein the parfocal adjusting means comprises a plate-shaped glass provided with a thickness and a refractive index such that an optical path length from the camera mount to the image sensor, in a condition in which the parfocal adjusting means is mounted and the optical filter is not mounted, is substantially equal to the optical path length in a condition in which the optical filter is mounted.

4. The electronic imaging apparatus according to claim 2, wherein the parfocal adjusting means comprises a spacer member that is capable of adjusting a distance between the camera mount and the image sensor.

5. The electronic imaging apparatus according to claim 2, further comprising a screw-, bayonet-, or magnet-type mounting and demounting mechanism to mount and demount the optical filter therethrough.

6. The electronic imaging apparatus according to claim 2, wherein the optical filter has a predetermined coating applied to at least an opposite-side surface of the optical filter with respect to the image sensor.

7. The electronic imaging apparatus according to claim 2, wherein one of a plurality of optical filters and lenses provided with functions of the optical filters are removably arranged.

8. The electronic imaging apparatus according to claim 2, wherein the dustproof glass has an antireflection coating applied to at least one surface, thereby reducing a reflectance in a visible region and one of (i) a reflectance in an infrared wavelength region, (ii) a reflectance in an ultraviolet wavelength region, and (iii) reflectances in both of the infrared wavelength region and the ultraviolet wavelength region.

9. The electronic imaging apparatus according to claim 1, further comprising a screw-, bayonet-, or magnet-type mounting and demounting mechanism to mount and demount the optical filter therethrough.

10. The electronic imaging apparatus according to claim 1, wherein the optical filter has a predetermined coating applied to at least an opposite-side surface of the optical filter with respect to the image sensor.

11. The electronic imaging apparatus according to claim 1, wherein one of a plurality of optical filters and lenses provided with functions of the optical filters are removably arranged.

12. The electronic imaging apparatus according to claim 1, wherein the dustproof glass has an antireflection coating applied to at least one surface thereof, thereby reducing a reflectance in a visible region and one of (i) a reflectance in an infrared wavelength region, (ii) a reflectance in an ultraviolet wavelength region, and (iii) reflectances in both of the infrared wavelength region and the ultraviolet wavelength region.

13. The electronic imaging apparatus according to claim 11 or 7, wherein the plurality of optical filters are placed in an inclined state with respect to the light receiving surface of the image sensor.

* * * * *